United States Patent [19]

Cuevas

[11] Patent Number: 4,923,212
[45] Date of Patent: May 8, 1990

[54] LIGHTWEIGHT NON-WELDED INFLATOR UNIT FOR AUTOMOBILE AIRBAGS

[75] Inventor: Jess Cuevas, Scottsdale, Ariz.

[73] Assignee: Talley Automotive Products, Inc., Phoenix, Ariz.

[21] Appl. No.: 233,191

[22] Filed: Aug. 17, 1988

[51] Int. Cl.⁵ .............................................. B60R 21/16
[52] U.S. Cl. ..................................... 280/736; 280/731
[58] Field of Search ............... 280/731, 736, 741, 727, 280/728, 743; 422/120, 122, 123, 125, 126

[56] References Cited

U.S. PATENT DOCUMENTS

| | | | |
|---|---|---|---|
| 2,779,281 | 1/1957 | Maurice et al. | 102/39 |
| 2,976,907 | 3/1961 | Harvey et al. | 153/10 |
| 3,117,424 | 1/1964 | Heberstreit | 62/48 |
| 3,303,560 | 2/1967 | Lansky et al. | 29/421 |
| 3,411,808 | 11/1968 | Chute | 280/150 |
| 3,413,013 | 11/1968 | Wissing et al. | 280/150 |
| 3,558,285 | 1/1971 | Ciccone et al. | 23/281 |
| 3,580,603 | 5/1971 | Chute | 280/150 |
| 3,618,976 | 11/1971 | Leising | 280/150 |
| 3,618,980 | 11/1971 | Leising | 280/150 |
| 3,624,810 | 11/1971 | Hass | 280/150 |
| 3,630,472 | 12/1971 | Axenborg | 244/122 |
| 3,666,289 | 5/1972 | Magyar | 280/150 |
| 3,674,059 | 7/1972 | Stephenson | 141/4 |
| 3,715,131 | 2/1973 | Hurley et al. | 280/150 |
| 3,727,942 | 4/1973 | Arntson | 280/150 |
| 3,752,500 | 8/1973 | Culver | 280/150 |
| 3,773,351 | 11/1973 | Catanzarite | 280/150 |
| 3,784,223 | 1/1974 | Hass et al. | 280/150 |
| 3,785,674 | 1/1974 | Poole et al. | 280/150 |
| 3,786,843 | 1/1974 | Stephenson et al. | 141/13 |
| 3,794,346 | 2/1974 | Brockman et al. | 280/150 |
| 3,797,854 | 3/1974 | Poole et al. | 280/150 |
| 3,805,569 | 4/1974 | Chartet | 72/56 |
| 3,819,203 | 6/1974 | Radke et al. | 280/150 |
| 3,819,205 | 6/1974 | Dunford et al. | 280/150 |
| 3,822,895 | 7/1974 | Ochiai | 280/150 |
| 3,827,715 | 8/1974 | Lynch | 280/150 |
| 3,831,873 | 8/1974 | Meacham | 280/150 |
| 3,834,729 | 9/1974 | Oka et al. | 280/150 |
| 3,843,152 | 10/1974 | Nomaka | 280/150 |
| 3,856,180 | 12/1974 | Merrell | 222/5 |
| 3,856,181 | 12/1974 | Merrell | 222/5 |
| 3,862,767 | 1/1975 | Chute | 280/150 |
| 3,865,273 | 2/1975 | Ziegler | 222/5 |
| 3,868,124 | 2/1975 | Johnson | 280/150 |
| 3,869,143 | 3/1975 | Merrell | 280/150 |
| 3,871,684 | 3/1975 | Staudacher et al. | 280/150 |
| 3,874,693 | 4/1975 | Patzelt et al. | 280/150 |

(List continued on next page.)

FOREIGN PATENT DOCUMENTS

| | | |
|---|---|---|
| 2330194 | 2/1974 | Fed. Rep. of Germany . |
| 3104843 | 8/1987 | Fed. Rep. of Germany ...... 280/736 |
| 2295861 | 9/1973 | France ................................... 280/736 |
| 445318 | 10/1967 | Switzerland . |
| 1359567 | 5/1973 | United Kingdom . |
| 1388697 | 5/1973 | United Kingdom . |

Primary Examiner—Richard A. Bertsch
Attorney, Agent, or Firm—Pennie & Edmonds

[57] ABSTRACT

A non-welded pyrotechnic gas-generating inflator apparatus which comprises: a domed diffuser member, open at one end; a closure plate member sealing the open end of the diffuser member, the members being sealed by magnaforming a peripheral lip portion of the diffuser member over the outer circumferential edge of the closure plate member, thereby forming an inflator housing; a sufficient amount of a combustible gas generant material within said housing to produce, upon the combustion thereof, a volume of a gaseous product sufficient to substantially inflate an automobile air bag within about 30–60 milliseconds; a combustion initiating device positioned within the housing adjacent the gas generant and a filter assembly for filtering the combustion product prior to its discharge from the inflator, the filter assembly circumferentially surrounding the gas generant within the housing. In fabricating the inflator, the filter assembly is simply lowered into position within the diffuser and the propellant is lowered into the filter cavity. Subsequently, the closure member is mated to the open end of the diffuser and the lip of the diffuser is magnaformed over the outer edge of the closure in the area where they overlap to form a structural seal.

29 Claims, 4 Drawing Sheets

U.S. PATENT DOCUMENTS

| | | | |
|---|---|---|---|
| 3,877,882 | 4/1975 | Lette et al. | 23/281 |
| 3,880,447 | 4/1975 | Thorn et al. | 280/150 |
| 3,887,215 | 6/1975 | Albrecht et al. | 280/150 |
| 3,895,823 | 7/1975 | Stephenson | 280/150 |
| 3,904,221 | 9/1975 | Shiki et al. | 280/150 |
| 3,907,330 | 9/1975 | Kondo et al. | 280/150 |
| 3,909,037 | 9/1975 | Stewart | 280/150 |
| 3,910,595 | 10/1975 | Katter et al. | 280/150 |
| 3,910,596 | 10/1975 | Wulbrecht et al. | 280/150 |
| 3,934,984 | 1/1976 | Marlow et al. | 23/281 |
| 3,938,824 | 2/1976 | Patzelt | 280/150 |
| 3,944,250 | 2/1976 | Wolf et al. | 280/150 |
| 3,944,769 | 3/1976 | Wagner | 200/83 |
| 3,958,949 | 5/1976 | Plantif et al. | 23/181 |
| 3,966,226 | 6/1976 | Roth | 280/737 |
| 3,968,980 | 7/1976 | Hay | 280/734 |
| 4,017,100 | 4/1977 | Gehrig et al. | 280/736 |
| 4,018,457 | 4/1977 | Marlow | 280/735 |
| 4,068,862 | 1/1978 | Ishi et al. | 280/740 |
| 4,131,299 | 12/1978 | Ono et al. | 280/736 |
| 4,131,300 | 12/1978 | Radke et al. | 280/737 |
| 4,153,273 | 5/1979 | Risko | 280/740 |
| 4,178,017 | 12/1979 | Ishi et al. | 280/740 |
| 4,278,638 | 7/1981 | Nilsson et al. | 280/736 |
| 4,296,084 | 10/1981 | Adams et al. | 423/351 |
| 4,394,033 | 7/1983 | Goetz et al. | 280/736 |
| 4,547,342 | 10/1985 | Adams et al. | 422/166 |
| 4,561,675 | 12/1985 | Adams et al. | 280/734 |
| 4,711,466 | 12/1987 | Breed | 280/741 |
| 4,722,551 | 2/1988 | Adams | 280/736 |
| 4,734,265 | 3/1988 | Nilsson et al. | 422/165 |

LIGHTWEIGHT NON-WELDED INFLATOR UNIT FOR AUTOMOBILE AIRBAGS

TECHNICAL FIELD

The invention relates to automobile passive restraint safety devices and, more particularly, to a lightweight pyrotechnic gas generator unit for inflating automobile air bags, wherein the unit is joined without the use of welds and/or rivets.

BACKGROUND OF THE INVENTION

Large numbers of people are killed or injured annually in automobile accidents wherein the driver and/or passengers are thrown forward so as to impact against solid surfaces within the vehicle. There has thus been considerable impetus toward development of passive restraint systems for use with these vehicles. One system which has been extensively investigated senses rapid deceleration of the vehicle such as that which occurs upon a primary impact between an automobile and, for example, another car. It thus initiates inflation of a bag between the interior surface of the car and the vehicle occupant prior to the occurrence of any secondary collision between the driver and/or passengers and the interior of the car. Inflation of the bag must therefore occur within milliseconds of the primary impact in order to restrain any occupants before they are injured due to secondary collisions against the solid surfaces within the vehicle.

Moreover, it is desirable to deflate the bag as soon as the impact of a crash is completed, so that the occupant is not trapped within the vehicle by an inflated bag. It is also desirable to deflate the bag rapidly so that, in case of accidental inflation, the restraint upon the person driving the automobile is sufficiently short that they do not lose control of the vehicle. In order to meet such criteria, specifications have been established whereby a bag should be inflated sufficiently to restrain an occupant in about 30–60 milliseconds after initiation, with substantial deflation occuring after about 100 milliseconds.

One of the problems with providing such a passive restraint system for protecting the driver of the automobile during a crash is how to arrange and position the device upon the steering column. For reasons of styling and consumer acceptance, as well as not interfering with the driver's movement or vision of the instrument panel, and so as not to degrade the vehicle's steering dynamics, it is desirable to arrange the crash restraint apparatus as conveniently as possible, and yet have it positioned so that it effectively accomplishes its intended protective function Further, since an inflating device for such a crash restraint system must be capable of discharging a relatively large volume of gas in a very short period of time (e.g., 30–60 milliseconds), there are safety considerations not only in the deployment of the inflator within the automobile, but also with regard to handling, installing, replacing and repairing such inflating devices.

In addition, in the particular case of a driver's side, i.e., steering wheel, installation, the utilization of an inflator apparatus with a low weight is important for several reasons. First, the wheel assembly is in a cantilevered position at the end of the steering column. Therefore, excessive weight upon the wheel assembly can cause excessive column whip attributable to vertical accelerations due to road shocks (e.g., bumps or chuckholes) which can lead to degraded if not loss of driver control. Secondly, if for reasons such as styling or driver vision line clearance, the inflator is required to be located asymmetrically with respect to the steering column centerline, any excessive weight attributable to this device will create resistive wheel turning torque, thus degrading the rotational dynamics of the steering assembly and providing potential for loss of driver control or other unusual or undesirable vehicle handling "feel" under certain driving conditions.

The recent emphasis on weight reduction for the purpose of fuel conservation in motorized vehicles, has thus created a need and a demand for a lighter weight inflation system. This is of particular importance in a crash protection system for the driver wherein the inflator is mounted on the vehicle's steering wheel. The availability of a lighter weight inflator for installation at this location further enables a reduction to be made in the weight of the vehicle's steering wheel and the steering column on which the inflator is mounted, providing a concurrent improvement in the "steerability" of the automobile.

In this regard, some recently introduced inflator devices utilize aluminum casing materials. The use of lighter materials such as aluminum in the construction of automobile air bag inflators, however, creates certain difficulties in that techniques need to be developed for rapidly connecting components formed of this material together in such a way as to ensure the formation of a structural seal therebetween, even while the generator is pressurized during the inflation cycle.

As noted above, there are in the prior art various devices which cause a protective bag to inflate in front of an automobile driver or passenger to cushion the impact with the steering wheel, dashboard or other interior vehicle surface. Usually the device is activated by an inertial switch responsive to a primary crash impact. This inertial switch in turn causes an inflator apparatus to quickly inflate a collapsed bag into a protective position in front of the driver or passenger.

The inflating gas is generally supplied either from a source of compressed air or other compressed gas, such as shown in Chute, U.S. Pat. No. 3,411,808 and Wissing et al., U.S. Pat. No. 3,413,013, and a number of other patents in the crash restraint field. In several other prior art patents (e.g., 3,880,447 to Thorn et al.; 4,068,862 to Ishi et al.; 4,711,466 to Breed; and 4,547,342; 4,561,675 and 4,722,551 to Adams et al.), the bag is inflated by igniting a pyrotechnic propellant composition and directing the gaseous combustion products produced thereby directly into the bag.

The first technique discussed above for inflating an air bag requires a reservoir of gas stored at a very high pressure, which may be discharged into the bag as soon as an impact is sensed. In order to obtain a sufficient volume of gas for inflating a vehicle occupant restraint bag, however, a relatively large reservoir of gas, at pressures of 3000 psi or more is required. To open the gas reservoir in the very short time interval required for ensuring the safety of the vehicle occupants, explosive arrangements have been employed in the prior art for bursting a diaphragm or cutting through a structural portion of the reservoir. Such explosive arrangements have significant inherent safety problems, such as the production of shrapnel by the explosion, as well as the relatively high sound level reached within the passenger compartment due to the explosion. The psychological factor of having these explosives in each automobile also cannot be ignored The gas bottle (i.e., reservoir) technique for inflating an air bag also suffers from an additional disadvantage in that the gas pressure is highest at the commencement of bag deployment and decreases as a function of time as the gas in the storage reservoir is depleted. Moreover, the pressure/time history of such pressurized gas inflator devices is difficult if not impossible to control at reasonable cost and reliability. Further, the pressurized gas technique is undesirable since a minor leak can result in all of the gas being lost during the long period that the passenger restraint system must remain in the automobile prior to any crash.

In addition, the adiabatic cooling of the gas as it expands from a storage condition of elevated pressure to the nearly ambient pressure of the inflatable bag reduces the effective volume of the gas available for inflating the bag. This cooling effect thus requires the manufacturer of the device to provide a total gas storage volume significantly greater than if the gas was initially stored at an elevated temperature.

The second technique discussed above employs a pyrotechnic gas generator having a rapidly burning propellant composition stored therein for producing substantial volumes of hot gaseous products which are then directed into the inflatable bag. Some compositions are available which produce a sufficiently low temperature combustion gas such that the gas may be directed substantially directly into the bag without danger to the vehicle's occupants. Other systems produce a high temperature combustion product requiring means for cooling the gas before it is introduced into the bag.

Many forms of gas generators or inflators utilizing combustible solid fuel gas generating compositions for the inflation of crash protection, i.e., "air bag", restraint systems are known in the prior art. Commonly encountered features among generators utilized for this purpose include: (1) an outer metal housing, (2) a gas generant composition located within the housing, (3) means to ignite the gas generant responsive to a signal received from a sensor positioned at a location removed from the inflator, and (4) means to filter and to cool the gas, positioned between the propellant composition and a plurality of gas discharge orifices defined by the generator housing.

One such gas generator includes an annular combustion chamber which is bounded by a welded outer casing or housing structure. The combustion chamber encloses a rupturable container or cartridge that is hermetically sealed and which contains a solid gas generant in pelletized form, surrounded by an annular filter assembly. The device further includes a central ignition or initiator zone and a toroidal filter chamber adjoining and encircling the combustion chamber. An inner casing or housing structure is located in close surrounding and supporting relationship to the rupturable container, the inner casing being formed by a cylinder having uniformly spaced peripheral ports or orifices near one end. These orifices provide exit holes to facilitate the flow of gas from the combustion chamber.

Alternately, inflator devices are constructed comprising first and second structural components or shells specifically, a first diffuser shell and a second base shell. Both shells are forged and heat treated, after which they undergo machining to obtain a proper fit therebetween. The first structural component, i.e., the diffuser shell, comprises three integral concentric cylinders. These cylinders form the inner structural walls of the inflator and define chambers therein containing the solid gas generant, the ignition means, and the filter assembly. The cylinder walls further define exit openings or ports for the passage of the gases between adjacent chambers and subsequently out of the inflator and into the protective air bag.

The second structural component, i.e., the base shell, is equipped with an initiator device, i.e., an electrical squib, for igniting the main propellant charge. A flange is provided around the outer periphery of the base shell for attaching an air bag thereto. The base shell additionally comprises three concentric mating surfaces corresponding to the concentric cylinders of the diffuser shell. The three concentric cylinders of the diffuser shell are thus mated to corresponding concentric mating surfaces located upon the base shell by a process such as inertia welding.

As noted above, gas filtration systems are normally utilized with generators of the type described above, to cool the gas and to remove particulate products produced as a result of the combustion of the pyrotechnic material. Filters included in prior art gas generators of the type described above ordinarily comprise a series of zones or chambers containing layers of metal screen material having a variety of mesh sizes and/or one or more layers of an inert fiber These filter components are typically separated from the central combustion chamber by thick support walls, which are required in this type of generator construction to withstand the elevated pressures produced during the ignition and combustion of the gas generant. A plurality of openings or ports are provided in these walls, through which the gas must pass in order to reach the filtration zone. Moreover, some sort of clip or pedestal arrangement within the filtration zone is normally required to maintain the plurality of screens, pads, etc. in proper position and alignment.

Gas generators must withstand enormous thermal and mechanical stresses for a short period during the gas generation process. Thus, inflators that have been and are currently being used with automobile air bag devices have been fabricated using heavy gauge steel for the casing and other structural housing components, with these components being joined together by, for example, screw threads, roll crimping or welding. More specifically, each of the gas generator units presently in commercial production is assembled and sealed with, for example, the use of some form of welding technique, such as inertia welding or electron beam welding.

SUMMARY OF THE INVENTION

It is thus an object of the present invention to provide a simplified inflator apparatus comprised of a minimum number of inexpensive components which are adapted to facilitate rapid robotic assembly.

It is a further object of the invention to provide an inflator constructed of a durable lightweight material such as aluminum, titanium or certain stainless steels (e.g., 301 stainless steel) in order to reduce the weight of the device in comparison to models currently produced using heavy steel components.

Another object of the present invention is to provide an inflator device having a reduced diameter due to the utilization of a unique dome-shaped housing configuration so as to maximize the available unused space within the automobile steering apparatus.

It is a still further object of the present invention to provide a gas generator for inflating an automobile passive restraint "air bag" device wherein the generator housing is structurally sealed by magnaforming the lip of the diffuser over the outer edge of a lower closure member without the need for welding these components together. This obviates the need for the attendant time-consuming and expensive inspection procedures currently required for such devices.

The present invention thus comprises an inflator, i.e., gas generator, apparatus adapted for providing a sufficient amount of a gaseous product by the combustion of a pyrotechnic composition stored within the housing thereof for substantially inflating an automobile air bag device in an interval of between about 30-60 milliseconds. This period approximates the time between the occurrence of a primary collision between the vehicle and, for example, a second car and a secondary collision occurring between the occupants of the automobile and the interior surfaces thereof, which occurs as a direct result of the primary collision.

The subject inflator apparatus is comprised of a small number, i.e., six, component parts in comparison to other prior art devices utilized for the same purpose which can contain on the order of about 15-30 parts. These components include: (1) a domed diffuser shell which is open at one end., (2) a flat closure member for sealing the open end of the diffuser, (3) a drive ring member, located circumjacent to the open end of the diffuser to assist in magnaforming the lower lip of the diffuser over the peripheral edge of the closure member; (4) an annular filter assembly located within the diffuser; (5) a propellant assembly positioned within the filter cavity and, (6) an initiator device, i.e., an electrically actuated squib, for initiating combustion of the propellant assembly.

The initiating squib is normally connected to one or more remote sensors located upon the body portion of the vehicle, which are adapted for sensing a primary impact and signalling the occurence of the collision to the squib, thus initiating a chain of combustion reactions which culminates in the inflation and deployment within the vehicle of a protective air bag.

Construction of the present inflator device encompasses the steps of simply lowering the annular filter assembly into the open end of the domed diffuser member, following which the propellant assembly is lowered into the filter cavity formed thereby. The closure member is subsequently lowered into the open end of the diffuser and the lower lip of the former is then magnaformed over the outer edge of the latter with the aid of the drive ring to provide a structural seal therebetween.

DETAILED DESCRIPTION OF THE PREFERRED EMBODIMENTS

Figure 1:
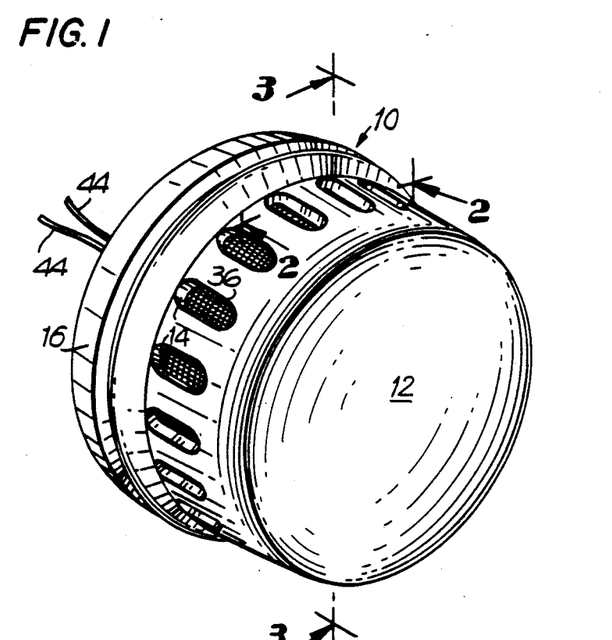
FIG. 1 is a perspective view of a gas generator apparatus constructed according to the present invention.

Referring initially to FIG. 1 there is illustrated applicant's air bag inflator apparatus 10. Inflator 10 is comprised of six main components, designed and adapted for simple robotic assembly. These components include: (a) a domed diffuser member, which is open at one end; (b) a closure member to seal the open end of the diffuser, thus forming the inflator housing; (c) a measured quantity of a pyrotechnic propellant composition placed within the housing; (d) a filter assembly located within the housing, outwardly adjacent the propellant, for cooling and filtering the gaseous products produced by the combustion of the propellant; (e) an igniter apparatus to initiate combustion of the propellant, and (f) a ring shaped member circumjacent to a portion of the diffuser which overlaps the closure member to assist in forming a structural seal between these components during the assembly thereof. The function of each segment (a-f) of inflator 10 is described in detail below.

As shown in FIG. 1, the housing of inflator 10 is fabricated in the form of a domed pressure vessel, since this design is well known as providing the optimum shape for containing a pressurized atmosphere, such as that which is produced when the propellant within inflator 10 is ignited. Moreover, the domed shape permits the use of an inflator having a smaller diameter than heretofore considered possible, without a concurrent need to thicken the inner support walls of the device, thus also providing an apparatus having a lower weight than those currently available.

More specifically, FIG. 1 illustrates diffuser 12 which forms a first (upper) portion of the inflator housing. Diffuser 12 is closed at one end by a domed roof portion as discussed above. The circumferential walls of this component further define a plurality of diffuser ports 14. Ports 14 are thus spaced equidistantly around the wall portions defining the peripheral circumferential boundary of diffuser 12. Each of diffuser ports 14 communicates through the diffuser wall with the combustion chamber located within the inflator housing through an abutting annular filter assembly (discussed below) interposed therebetween.

One advantage of the present inflator configuration over existing inflators is in its simplicity of construction and ease of assembly. The filter assembly is simply lowered into position within diffuser 12, after which the propellant is lowered into the filter cavity, whereupon the closure member (not shown) is lowered and mated to diffuser 12 by forming the diffuser lip thereover (see, e.g., FIG. 3) utilizing a technique known as magnaforming, which is described below in detail.

The diffuser/closure assembly process is carried out in the prior art by welding these two components together as discussed above. This practice, however, necessitates the inclusion of thick (i.e., heavy) walls or support members in the interior of the generator housing, which are unnecessary in the present device; as well as requiring a costly, time-consuming inspection of every weld. This weld inspection step requires an expensive x-ray inspection device and a trained operator to carry out these inspections. Thus, the process preferred by applicant for sealing the present infator 10 utilizes a procedure known as a magnaforming, such as that described in U.S. Pat. No. 2,976,907 to Harvey et al., (the "'907 patent") the disclosure of which is expressly incorporated herein by reference.

Applicant has further determined that the best results are obtained with the subject magnaforming technique when the temper of the metal of which the components of inflator 10 are formed is as high as possible without being such that the metal cracks during the magnaforming process due to excessive brittleness. This ensures that inflator 10 can be constructed of lightweight materials (such as aluminum) while still maintaining a sufficient degree of structural strength to withstand the forces generated within the unit during the combustion of the propellant.

By the use of a magnaforming process such as that described in the '907 patent, a variable magnetic field is created adjacent the work piece, i.e., in the area where diffuser 12 and closure member (not shown) overlap. Subsequently, one or more force impulses set up by the magnetic field are directed against the lower lip of diffuser 12, which is oriented at a first position diverging outwardly, i.e., away from, the peripheral edges of the closure member. The effect of these force impulses is to smoothly force the diffuser lip inwardly over the edge of the closure member to a second position at an angle of substantially 180 with the remainder of the circumferential wall of diffuser 12 without the need for physically contacting the diffuser lip with any mechanical device. This procedure creates a compression seal between diffuser 12 and the underlying closure member. Thus, no welds are necessary to assemble inflator 10, since the magnaforming process is both faster and more reliable than the previously practiced welding procedure.

In the particular magnaforming technique preferred by the applicant, drive ring 16 is utilized to enhance the effect of the force impulses in sealing the two inflator components. Ring 16 is preferably formed out of the same material used to fabricate the inflator housing, i.e., aluminum, although other strong but lightweight materials may be substituted for the aluminum used to form inflator 10, such as 301 stainless steel or titanium. The drive ring 16 is initially slipped over the domed end of inflator 10 and permitted to slide downwardly toward the open end thereof to the point where the wide lower lip of diffuser 12 prevents any further downward motion.

As the magnetic field produced by the magnaforming apparatus (not shown) surrounds these components, drive ring 16 is collapsed inwardly, causing the metal lip of diffuser 12 to flow over and seal against the peripheral edge of the closure member in the area where their surfaces overlap. Thus, the use of driver ring 16 in the magnaforming process used to form the inflator housing serves to enhance and direct the effect of the energy pulse and adds strength to the bond formed between the two pieces of metal, i.e., diffuser 12 and the closure member. Ring 16 serves to even out the amount of energy directed at any one location, thus permitting a tighter seal requiring less energy to produce.

Thus, as noted above, the advantage of applicant's use of the magnaforming process to seal the components of inflator 10 lies in the speed with which this assembly can now be completed, i.e., in seconds instead of minutes, in contrast to the tedious and expensive welding techniques relied upon in the prior art. As disclosed in the '907 patent, however, the technique of magnaforming is well known in the prior art and is not claimed as having been developed by the applicant.

A weld inspection step, required for all gas inflators currently manufactured and requiring expensive, difficult to operate equipment, is now also obviated by applicant's use of the magnaforming technique as disclosed herein, since the effectiveness of applicant's magnaforming operation can be much more easily determined without x-raying inflator 10, by simply calculating the dimensions of the completed unit to determine whether they fall within predefined ranges.

In addition, with the use of the presently described assembly process for forming inflator 10, there is no longer any necessity to utilize a back-up method for sealing the infator, such as, by crimping or riveting the diffuser and the closure, i.e., methods which have been relied upon in the past. This provides a further saving in both time and energy as well as in parts costs. Moreover, the application of the presently described process permits the use of inexpensive forged metal parts rather than more expensive machined components for both diffuser 12 and the closure member.

Figure 2:
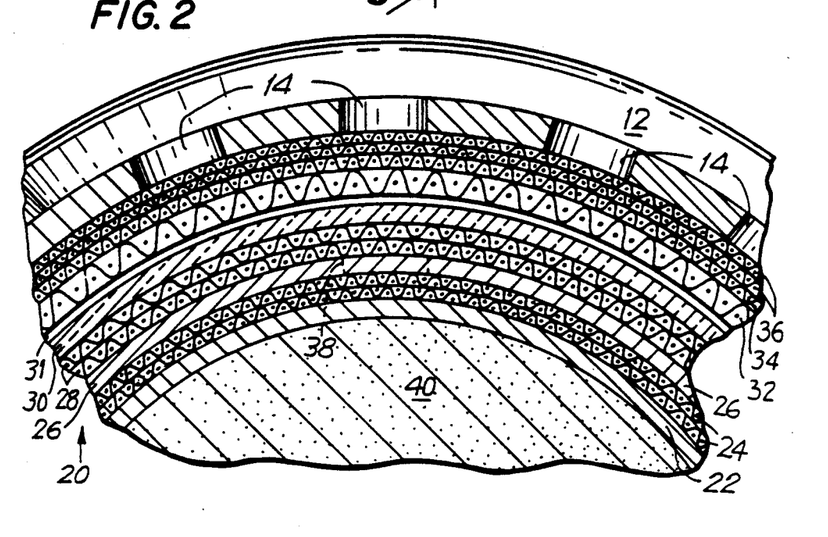
FIG. 2 is a sectional view taken along the line 2—2 of FIG. 1.

Turning now to FIG. 2 there is illustrated a cross-sectional view taken through diffuser ports 14 and showing the various layers which comprise filter assembly 20. These layers comprise, starting from the side adjacent the propellant compartment, a first frame member portion 22; two layers of a coarse "slag screen" material 24, preferably of 14 mesh (i.e., 1400 micron) screen; a second frame member portion 26; two additional layers of "slag" screen 28; a third frame member portion 30; a layer of a fine 100 micron screen 31; a layer of an inert ceramic fiber pad 32, such as Fiberfrax®, (i.e., a mixture of aluminum oxide and silica oxide, sold by Sohio Carborundum, Inc. of Niagra Falls, N.Y., a division of the Standard Oil Co.); a second layer of screen 34 having a mesh size of 100 microns and finally, a double layer 36 of a very fine mesh screen, i.e., 28 mesh, which abuts the inner surfaces of diffuser port 14. Tabs 38 (one of which is shown in phantom), which are preferably four in number, serve to maintain the required separation between the filter frame members (see, e.g., FIG. 8).

Within the interior portion of the generator, adjacent filter assembly 20, is the propellant cavity which contains a measured amount of pyrotechnic gas-generating composition 40.

Filter assembly 20 is provided to cool the gas created by the combustion of propellant 40 in the propellant cavity as it travels a tortuous path through the various layers of screen material and ceramic fibers and to prevent the passage therethrough of particulate reaction products formed during combustion of pyrotechnic composition 40. The mesh sizes of the screen layers thus become progressively smaller, as illustrated in FIG. 2, as the gas traverses filter 20 from the propellant cavity toward diffuser ports 14. This serves to ensure that hot particulate materials do not exit inflator 10 during the gas-generating stage and impinge upon the inner surface of the bag (not shown) thus damaging the effectiveness of the passive restraint and creating the opportunity for injury to the vehicle's driver and/or passenger.

Figure 3:
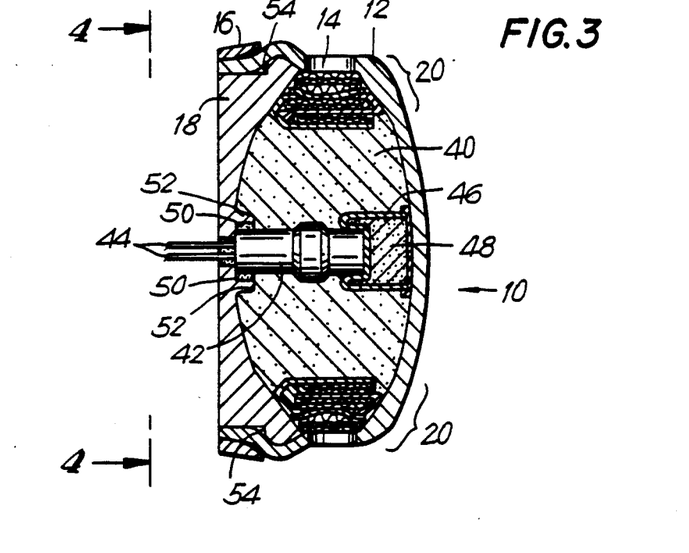
FIG. 3 is a sectional view taken along the line 3—3 of FIG. 1.

FIG. 3 illustrates a transverse sectional view through inflator 10, illustrating certain features of the unit not visible in FIG. 2. That is, the subject drawing figure illustrates features such as the means by which the combustion of pyrotechnic gas generating composition 40 is initiated. The combustion is begun through the use of, preferably, an electrically activated initiating squib 42, which contains a small charge of an electrically ignitable combustible material, connected by leads 44 to at least one remote sensing device (not shown), of a type well-known in the art. Such sensing devices may be located, for example, in the front bumper and/or, side fenders of the automobile. In inflator 10, squib 42 may, for example, be threaded through an aperture located in closure member 18 or, as in the present case, it may be "potted", i.e. glued, with the use of an epoxy 50 between two shoulders 52 formed by closure 18. Leads 44 extend outwardly from inflator 10 to connect with the remote sensing devices.

An upper portion of squib 42 abuts against enhancer packet 46, containing a quantity of a gas-generating material, such as a mixture of boron/potassium nitrate, i.e., $BKNO_3$ 48, which is preferably employed in powdered form to provide the maximum available burning surface for the fastest possible response. Other rapidly combustible materials known to those skilled in the art may also be utilized for the same purpose but applicant has consistently obtained favorable results with the use of $BKNO_3$. In operation, upon a signal from a remote sensor (not shown), the resultant electrical discharge heats a wire strand (not shown) within squib 42 which ignites the propellant charge within the body of the squib. A stream of hot gasses produced by this combustion is then directed (due to the orientation of squib 42) into enhancer packet 46 whereupon the powdered $BKNO_3$ mixture 48 begins to burn.

While $BKNO_3$ is very successful in igniting the main propellant charge 40, it suffers from a serious deficiency in that the autoignition temperature of this material is extremely high, i.e., from about 600°–700° F. Since the compositions chosen for the main propellant charge of inflator 10 ignite at an even higher temperature in the conditions normally encountered in, for example, a car fire, the $BKNO_3$ within the unit would be at a temperature in excess of 600° F. before ignition would take place.

In such a situation, the generator housing would be subjected to even higher temperatures, i.e., in the range of from 800°–900° F., and the main propellant charge would also be at a high temperature, perhaps 400°–500° F. Under these conditions, under laws of temperature and pressure well known to those skilled in the propellant art, the propellant charge would burn very rapidly and generate gas at an extremely high pressure, thus creating a situation wherein an explosive fragmentation of the weakened generator housing becomes a distinct possibility.

It is therefore preferred to incorporate an autoignition material with the $BKNO_3$ within enhancer packet 44. This material is capable of autoignition at a lower temperature than $BKNO_3$. Its use would result in an ignition of the main propellant charge 40 while this charge was at a much lower temperature than that described above. Thus, the main propellant charge 40 would burn at a much lower rate and produce gas at a significantly lower pressure.

This additional "auto ignition" material is preferably a stabilized nitrocellulose composition such as IMR 4895 which autoignites at less than about 400° F. The preferred material is produced by the DuPont Corporation, but any combustible material capable of performing in this manner would be acceptable for use in the present invention.

The end effect of combining such an auto-ignition material with, for example, the $BKNO_3$ enhancer composition so as to render this mixture an integral part of applicant's ignition chain is to prevent a weakening of the generator housing, thus diminishing or altogether removing the chance of an explosive overpressurization. This removes one potential danger to passengers and/or bystanders in the event of a car fire.

The rapid generation of hot gasses produced by the combustion of the $BKNO_3$/auto-ignition composition mixture acts to burst the walls of enhancer packet 46 and impinges upon the main propellant composition 40, preferably comprising a mixture of sodium azide and at least a stoichiometric amount of a metal oxide such as copper oxide. A variety of compositions, well known to those of ordinary skill in the art, may be utilized as the main propellant charge 40 for inflator 10 described herein.

Applicant prefers, for use in the presently described generator, the various compositions described in U.S. Pat. No. 3,895,098 to John F. Pietz, issued July 15, 1975 and reissued Jan. 26, 1988 as U.S. Pat. No. Re. 32,584, entitled METHOD AND COMPOSITION FOR GENERATING NITROGEN GAS. The disclosure thereof is therefore incorporated herein by reference. Among the propellant compositions disclosed in the subject patent is that which comprises a mixture of sodium azide with a stoichiometric amount of copper oxide which, as noted above, is preferred.

Alternatively, compositions substituting nickel and iron oxidizers may be utilized, but these generants, although capable of a slightly higher effective gas output than the $CuO/NaN_3$ mixture described above, often require the addition of an ammonium perchlorate burn rate enhancer to reach their full potential (as disclosed in U.S. Pat. No. 4,604,151 issued on May 8, 1986 to Knowlton and Pietz, also incorporated herein by reference, entitled METHOD AND COMPOSITION FOR GENERATING NITROGEN GAS INCLUDING AMMONIUM PERCHLORATE CATALYST. Since, as discussed above, a large number of different pyrotechnic compositions are operable within inflator 10, the present invention should not be limited solely to the compositions disclosed above.

In the preferred embodiment of the present invention, the main propellant mixture 40 is formed into small pellets, approximately the size of aspirin tablets. An appropriate amount of these pellets, calculated to produce a sufficient amount of gaseous combustion product to inflate an attached air bag within 30–60 milliseconds, is placed within either a sealed plastic bag, closed with the use of either a heat sealing device or an adhesive material, or a foil packet, closed and sealed in the same manner, and placed in diffuser 12 within the propellant cavity defined by filter assembly 20.

In an alternate embodiment of the invention, the propellant composition may be molded or extruded into a single porous grain which is conformed to the size and shape of the propellant cavity. An important consideration with the use of such a grain, however, is to ensure that it has a sufficient degree of porosity so as to provide a sufficient burning surface, thus permitting the flame front to advance through the grain with sufficient speed in order to provide, within a 30–60 millisecond period, a desired volume of gas sufficient to inflate the air bag.

The plastic or foil container used to hold the propellant mixture facilitates assembly of the unit by providing a convenient pre-weighed package adapted for simple robotic insertion into the diffuser housing. The thin outer packaging creates no hindrance to the rapid expansion of the gasses produced by combustion of the propellant, i.e., it is simply blown open by the gas.

As the gas is produced due to the combustion of propellant 40, it travels in a tortuous path through filter assembly 20, wherein it is cooled and substantially all of the molten particulates are removed, prior to exiting through diffuser ports 14 and entering the air bag (not shown). As a result of following this tortuous gas path, there is thus no need to prefilter the gas prior to its passage through the filter assembly, such as must be done in many prior art inflators.

It can also be seen from FIG. 3 that annular filter assembly 20 is positioned so as to become wedged between diffuser 12 and closure member 18 upon the formation of the inflator housing. That is to say that filter assembly 20 is configured on its upper and lower surfaces, respectively, to extend outwardly at an angle of about 1½ greater than the internal contact angles of diffuser 12 and closure 18. This creates a circular line contact between filter assembly 20 with diffuser 12 (along its upper surface) and with closure member 18 (on its lower surface) around the entire circumference of filter 20. A tight seal is thus created which prevents the gas produced by the combustion of pyrotechnic mixture 40 from moving in any direction but through filter 20. Thus, when inflator 10 senses internal pressures created by the combustion of propellant composition 40, filter assembly 20 is forced outwardly, by hoop stresses produced by the combustion, further into the wedged portion of infator 10, so as to enhance the seal around the edges of filter assembly 20.

Moreover, in the interests of obtaining the tightest possible seal between diffuser 12 and closure member 18, a resilient O-ring, preferably made of rubber, (not shown) may be positioned between the lower lip of diffuser 12 and the outer edge of closure member 18 during the magnaforming process, i.e., in the space 54. While the seal provided by the presence of the O-ring is not required to maintain the integrity of inflator 10 during the combination stage, it can be relied upon to serve as additional insurance for enhancing the seal between diffuser 12 and closure member 18.

Figure 4:
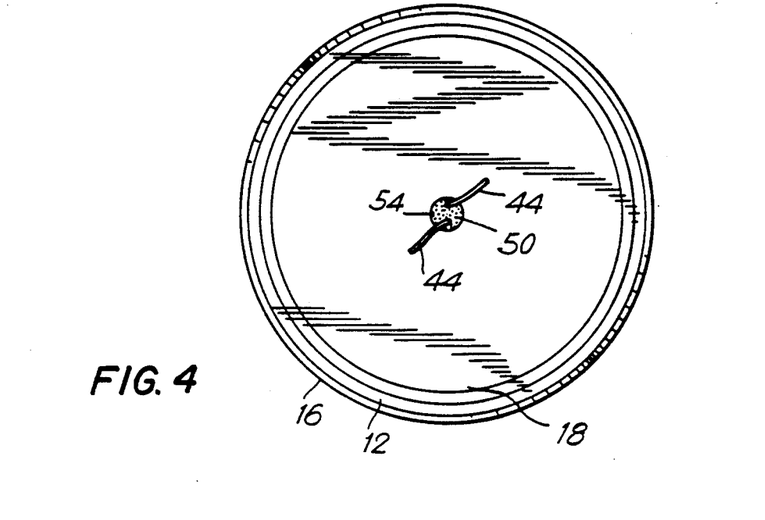
FIG. 4 is a bottom plan view of applicant's device.

FIG. 4 is a bottom plan view of inflator 10 illustrating the circumjacent relation between drive ring 16, overlapping the lip of diffuser 12, which is formed over the peripheral edge of closure member 18. As noted above, leads 44 from squib 42 extend outwardly through aperture 54 defined by closure member 18 and communicate to a remote impact-sensing device (not shown) located elsewhere on the vehicle.

Figure 5:
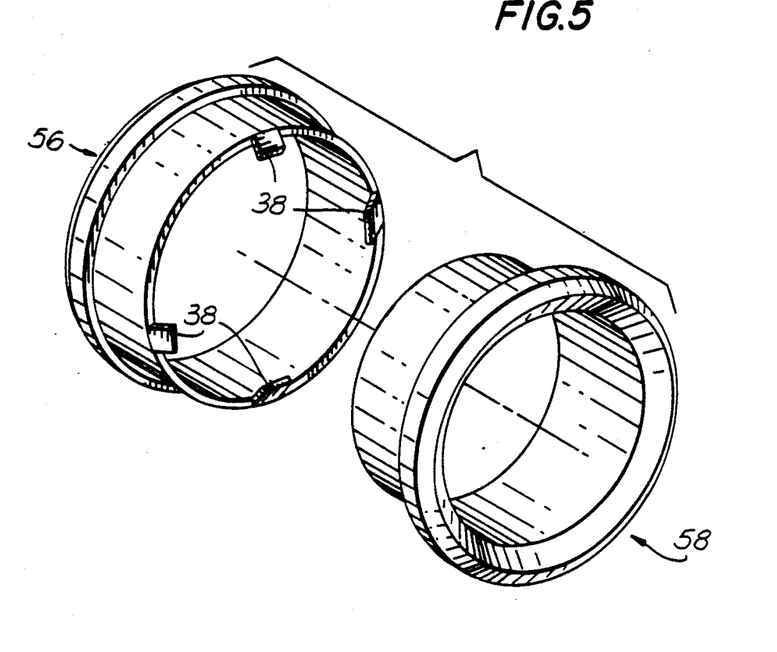
FIG. 5 is an exploded view of a frame portion of a filter assembly for use with the inflator of FIG. 1.

FIG. 5 illustrates members 56, 58 which are interlocked to form a frame for filter assembly 20. The members 56, 58 are preferably fabricated from sheet metal (e.g., aluminum) stampings in order to reduce the weight of the assembly. Tabs 38 act as spacers and maintain a degree of separation between frame members 56, 58 sufficient to permit the arrangement therebetween of the screens and inert fiber pads, described with regard to FIG. 2, which serve to filter the particulates from the gaseous combustion product and to absorb some of the heat therefrom so as to cool the gas to a temperature approaching ambient. This prevents the impingement of hot gasses and molten particulates directly against the inner surface of the bag, which would likely lead to a failure of the bag during the inflation cycle.

Figure 6:
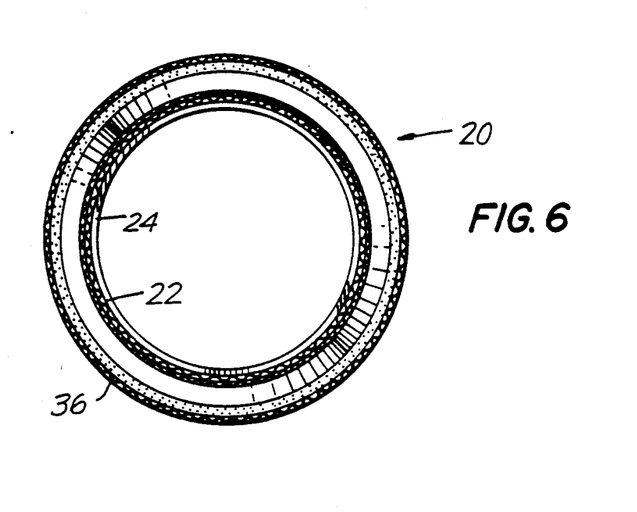
FIG. 6 is a top plan view of the subject filter assembly.

FIG. 6 is a top plan view of filter assembly 20 as it is oriented within the housing of inflator 10 when mounted upon an automobile steering column. This illustration depicts the appearance of filter assembly 20 when frame members 56, 58 are snapped together and the filtration layers of slag screen, fine screen and inert ceramic fiber are wound therearound. The assembly is preferably held together by welding the outermost mesh to both frame members, 56, 58, i.e., at the outer periphery of the frame, but alternate methods utilizing, for example, fastening means or adhesives, may also be utilized.

Figure 7:
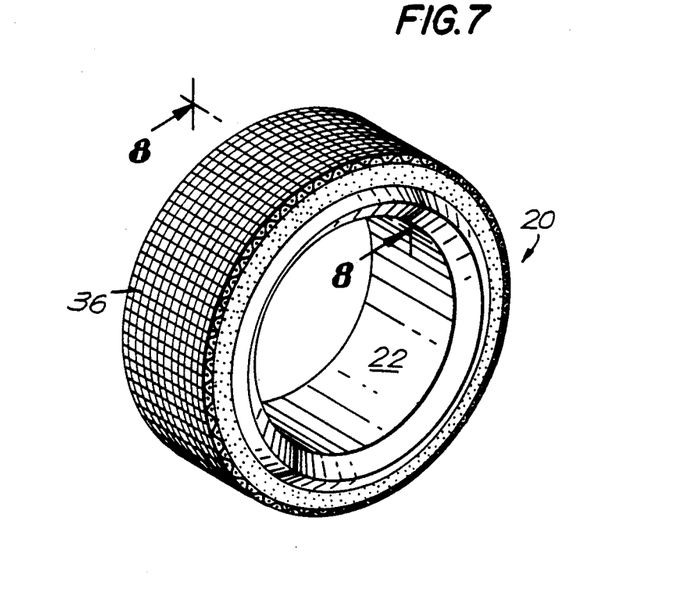
FIG. 7 is a perspective view of the filter assembly of FIG. 6.

FIG. 7 is a view of filter assembly 20 in perspective, further illustrating the annular arrangement of this component. The outermost layer of screen material 36, comprising a fine 28 mesh screen, which, when filter assembly is in position within inflator 10, abuts against the inside of diffuser ports 14, may by clearly seen. The remaining layers of screen and fiber pads lie directly underneath layer 36 in a doughnut shaped arrangement. The preferred method of sealing assembly 20 together, i.e., by welding, may also be clearly seen. The weld continues completely around both the top and bottom edges of filter assembly 20 to ensure a secure seal among the components and to prevent disassembly due to the tremendous pressures exerted during ignition of propellant composition 40.

Figure 8:
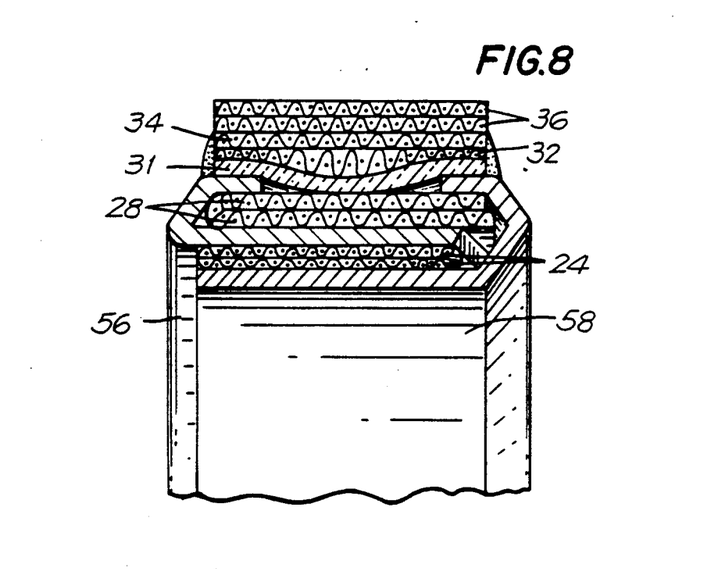
FIG. 8 is a sectional view taken along the line 8—8 of FIG. 7.

FIG. 8 depicts a lateral cross-sectional view taken through filter assembly 20, illustrating the filter layers much in the manner shown in the longitudinal section depicted in FIG. 2. Viewing the assembly from (inner) frame member 56 toward outer member 58, the gas produced by the combustion of propellant 40 travels over the top of member 56 and down through slag screens 24, around frame member 58, through slag screens 28, and thereafter through: (a) the 100 micron screen 31; (b) the fiberfrax® pad 32; (c) a second 100 micron screen 34; and (d) two layers of 28 mesh screen 36. Upon exiting from this filter assembly, substantially all of the particulate material has removed from the gas.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. A lightweight, non-welded inflator apparatus which comprises:
   (a) a domed diffuser member, having a first open end and a second closed end;
   (b) a closure plate member sealing the open end of said diffuser member, thereby forming an inflator housing;
   (c) a sufficient amount of a combustible gas generant material within an interior portion of said housing to produce upon combustion thereof a volume of a gaseous product sufficient to substantially inflate an automobile air bag within about 30–60 milliseconds;
   (d) means for initiating combustion of said gas generant material, said initiating means positioned within said housing adjacent said gas generant; and
   (e) means within said housing for filtering said gaseous combustion product prior to its discharge from the inflator housing, said filtering means circumferentially surrounding said gas generant material adjacent an inner wall portion of said housing, and adapted for cooling said gas and removing substantially all particulate matter therefrom, said closure plate member and said domed diffuser member being sealed together without welding either of said members to form an inflator housing capable of withstanding elevated pressures produced by combustion of said gas generant material.

2. The inflator apparatus of claim 1 wherein a peripheral lip portion on said open end of said diffuser member is magnaformed over an outer circumferential edge of said closure plate member so as to form a structural seal therebetween.

3. The inflator apparatus of claim 2 further comprising a drive ring member positioned circumjacent said housing upon a portion of said housing wherein said diffuser member overlaps said closure pate member for enhancing said seal formed between said diffuser and said closure plate.

4. The inflator apparatus of claim 3 wherein both said diffuser member and said closure member are fabricated from a relatively light-weight, corrosion resistant, high tensile strength material.

5. The inflator apparatus of claim 4 wherein said light-weight, corrosion resistant high tensile strength material is selected from aluminum, titanium and stainless steel.

6. The inflator apparatus of claim 5 wherein said drive ring member is formed of the same material used to fabricate said diffuser member and said closure plate member.

7. The inflator apparatus of claim 1 wherein said diffuser member defines a plurality of diffuser ports spaced equidistantly around the periphery of said diffuser, said ports providing fluid communication between a combustion cavity within said inflator housing and an interior portion of an automobile air bag operatively associated therewith so is to permit the deployment thereof upon the combustion of said gas generant material.

8. The inflator apparatus of claim 7 wherein said filtration means is interposed between said combustion cavity and said plurality of diffuser ports, to permit filtering and cooling of said gaseous product prior to the entry thereof into said automobile air bag.

9. The inflator apparatus of claim 1 wherein said combustion initiating means comprises an electrically actuated squib.

10. The infator apparatus of claim 9 wherein said squib is operatively associated with at least one remote impact sensing means, said sensing means capable of determining the occurence of a primary collision between an automobile in which it is installed and another object and producing a signal as a result thereof which acts to initiate combustion of said gas generant material.

11. The inflator apparatus of claim 10 wherein said squib is secured within said inflator housing by fastening means or adhesive means.

12. The infator apparatus of claim 11 wherein said adhesive means is an epoxy composition.

13. A lightweight non-welded pyrotechnic gas-generating inflator apparatus which comprises:
(a) a domed diffuser member having a first open end and a second closed end, said diffuser member defining a plurality of diffuser ports spaced equidistantly around the periphery thereof, said ports providing fluid communication between a combustion cavity defined within said infator and an interior portion of an automobile air bag operatively associated with said inflator so as to permit the deployment of said air bag upon combustion of a pyrotechnic gas generant material stored within said inflator;

(b) a closure plate member sealing the open end of said diffuser member, thus forming an inflator housing; both said diffuser member and said closure plate member formed of a relatively light-weight, corrosion-resistant, high tensile strength material, (c) a sufficient amount of a combustible gas generant material within the combustion cavity to produce, upon combustion, a volume of a gaseous product sufficient to substantially inflate said automobile air bag within about 30–60 milliseconds;

(d) an electrically actuated squib adhesively secured within said housing, said squib operatively associated with at least one remote impact sensor capable of determining the occurence of a primary collision between an automobile in which it is installed and another object and producing a signal as a result thereof which acts to initiate combustion of said gas generant material; and (e) a filter assembly within said inflator housing interposed between said gas generant material and said diffuser ports to permit filtering and cooling of said gaseous combustion products prior to the entry thereof into said automobile air bag, said open end of said diffuser member being magnaformed over an outer peripheral lip portion of said closure plate member with the aid of a drive ring member circumjacent to said diffuser member upon a portion of said housing wherein said diffuser member overlays said closure plate member to form a structural seal therebetween.

14. The inflator apparatus of claim 13 which further comprises a resilient O-ring between said open end of said diffuser member and said outer peripheral lip portion of said closure member to enhance the seal therebetween upon ignition of said inflator.

15. The inflator apparatus of claim 13 wherein said lightweight, corrosion-resistant high tensile strength material is selected from aluminum, titanium and stainless steel.

16. The inflator apparatus of claim 13 wherein said gas generant material is discreetly packaged within container means within the combustion cavity of said inflator.

17. The inflator apparatus of claim 16 wherein said container means comprises a sealed packet formed of a material selected from plastic and a metal foil.

18. The inflator apparatus of claim 17 wherein said packet is sealed by means selected from fastening means, adhesive means and heat sealing means.

19. The infator apparatus of claim 18 wherein said gas generant material comprises an alkali metal or an alkaline earth metal azide and at least a stoichiometric amount of a metal oxide.

20. The inflator apparatus of claim 19 wherein said gas generant material comprises a mixture of sodium azide and at least a stoichiometric amount of copper oxide.

21. The inflator apparatus of claim 13 which further comprises means for enhancing the speed of combustion of said generant material.

22. The inflator apparatus of claim 21 wherein said combustion enhancing means comprises a separate enhancer packet located within said combustion cavity adjacent said squib, containing a homogeneous mixture of an ignition enhancing material and an auto-ignition composition.

23. The inflator apparatus of claim 22 wherein said ignition enhancing material comprises $BKNO_3$ and said auto-ignition material is a stabilized nitrocellulose composition.

24. The inflator apparatus of claim 13 wherein said gas generant material is present in the form of a quantity of pressed tablets.

25. The inflator apparatus of claim 13 wherein said gas generant material is present as a single porous propellant grain having a plurality of randomly oriented radially and longitudinally interconnected porous channels of various diameters extending entirely through said grain to increase the burning surface thereof.

26. A lightweight non-welded pyrotechnic gas-generating inflator apparatus consisting essentially of:
(a) a domed diffuser member having a first open end and a second closed end, said diffuser member defining a plurality of diffuser ports spaced equidistantly around the periphery thereof, said ports providing fluid communication between a combustion cavity defined within said inflator and an interior portion of an automobile air bag operatively associated with said inflator so as to permit the deployment of said air bag upon combustion of a pyrotechnic gas generant material stored within said inflator;
(b) a closure plate member sealing the open end of said diffuser member, thus forming an inflator housing; both said diffuser member and said closure plate member formed of a relatively lightweight, corrosion-resistant, high tensile strength material,
(c) a sufficient amount of a combustible gas generant material within the combustion cavity to produce, upon combustion, a volume of a gaseous product sufficient to substantially inflate said automobile air bag within about 30–60 milliseconds;
(d) an electrically actuated squib adhesively secured within said housing, said squib operatively associated with at least one remote impact sensor capable of determining the occurence of a primary collision between an automobile in which it is installed and another object and producing a signal as a result thereof which acts to initiate combustion of said gas generant material; and
(e) a filter assembly within said inflator housing interposed between said gas generant material and said diffuser ports to permit filtering and cooling of said gaseous combustion products prior to the entry thereof into said automobile air bag,
said open end of said diffuser member being magnaformed over an outer peripheral lip portion of said closure plate member with the aid of a drive ring member circumjacent to said diffuser member upon a portion of said housing wherein said diffuser member overlaps said closure plate member to form a hermetic seal therebetween.

27. A method for constructing a lightweight non-welded inflator apparatus for installation in an automobile passive safety device, said method comprising:
(a) forging a diffuser member of a material which is relatively lightweight, corrosive resistant and having a high tensile strength, said diffuser member having a first domed end and a second open end;
(b) lowering filter assembly means through said open end of said diffuser member and into position therein;
(c) lowering a discreetly packaged propellant assembly into a combustion cavity within said diffuser member defined by said filter assembly means;
(d) forging a substantially flat closure plate member for sealing the open end of said diffuser member;
(e) mating the closure plate member to the open end of the diffuser member; and
(f) magnaforming said diffuser member over a peripheral edge of said closure plate member to form a structural seal therebetween without welding, capable of withstanding elevated pressures produced by the combustion of said propellant.

28. A method for substantially inflating an automobile occupant passive restraint device in an interval between a primary collision of the automobile with another object and a secondary collision between a vehicle occupant thereof and the interior surfaces of said automobile, said method comprising:
(a) constructing a lightweight non-welded inflator apparatus by the method of claim 27;
(b) installing said inflator apparatus as a portion of said passive restraint device in a steering wheel assembly within said automobile;
(c) actuating initiating means located within said inflator so as to ignite and thus completely burn said propellant;
(d) filtering a gaseous combustion product produced as a result of the combustion of said propellant; and
(e) discharging said gaseous product from said inflator into an automobile airbag operatively associated therewith so as to substantially completely deploy said air bag between said occupant and the interior of said automobile.

29. A lightweight, non-welded inflator apparatus which comprises:
(a) a doomed diffuser member, having a first open end and a second closed end;
(b) a closure plate member sealing the open end of said diffuser member, thereby forming an inflator housing;
(c) a sufficient amount of a combustible gas generant material within an interior portion of said housing to produce, upon combustion thereof, a volume of a gaseous product sufficient to substantially inflate an automobile air bag within about 30–60 milliseconds;
(d) means for initiating combustion of said gas generant material, said initiating means positioned within said housing adjacent said gas generant; and
(e) means within said housing for filtering said gaseous combustion product prior to its discharge from the inflator housing, said filtering means circumferentially surrounding said gas generant material adjacent an inner wall portion of said housing, and adapted for cooling said gas and removing substantially all particulate matter therefrom,
said open end of the diffuser member being magnaformed over an outer peripheral lip portion of said closure plate member with the aid of a drive ring member circumjacent to said diffuser member upon a portion of said housing wherein said diffuser member overlaps said closure plate member to form a structural seal therebetween.

* * * * *